April 10, 1962 R. F. WALDROP 3,029,322
BYPASS STRUCTURE FOR ELECTRICAL METER SOCKETS
Filed Sept. 21, 1959 2 Sheets-Sheet 1
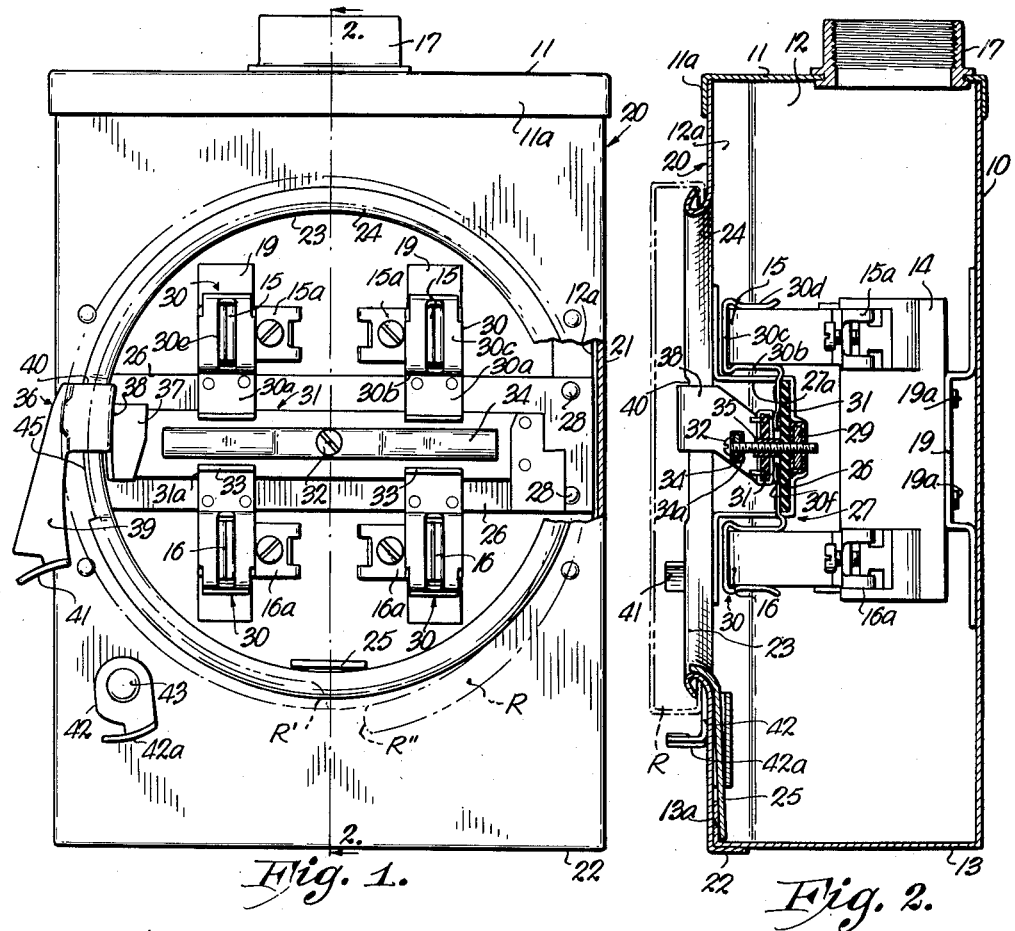
Fig. 1.
Fig. 2.
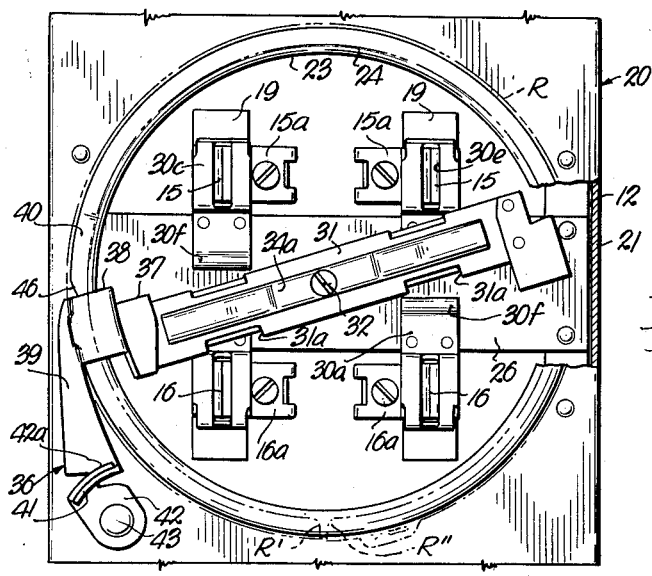
Fig. 3.
INVENTOR.
Robert F. Waldrop
BY
ATTORNEY.

April 10, 1962  R. F. WALDROP  3,029,322
BYPASS STRUCTURE FOR ELECTRICAL METER SOCKETS
Filed Sept. 21, 1959  2 Sheets-Sheet 2

INVENTOR.
Robert F. Waldrop
BY
ATTORNEY.

United States Patent Office 3,029,322
Patented Apr. 10, 1962

3,029,322
BYPASS STRUCTURE FOR ELECTRICAL
METER SOCKETS
Robert F. Waldrop, Mission Hills, Kans., assignor to Milbank Manufacturing Co., Inc., Kokomo, Ind., a corporation of Indiana
Filed Sept. 21, 1959, Ser. No. 841,257
6 Claims. (Cl. 200—51.1)

This invention relates to the equipping of electrical meter sockets with bypass facilities, and refers more particularly to structure by which this can be accomplished in conventional sockets presently in use and being sold.

As known to those versed in the art, the large bulk of watt-hour meters in use today are of the detachable type. Meters of this type are self-contained and are usually provided with projecting blades, which, when the meter is connected into the electrical system, are received in spring jaw terminals carried by a suitable socket. The jaw terminals of the socket are connected respectively with the power lines and consumer load lines. Insertion of the meter in the socket completes the circuit and directs the current through the meter where the extent of use is measured in known fashion.

One disadvantage which has previously been recognized in the simple meter socket arrangement is that the power supply to the consumer is shut off whenever the meter is detached for purposes of testing, repair or replacement. In many cases, for example doctors' offices, hospitals, manufacturing plants utilizing special electrical equipment, and others, this is highly undesirable. Even a momentary power failure can have disastrous results.

In the past, there have been developed a number of different ways of accomplishing bypassing of the meter prior to removal. The bypass arrangements can be classified generally into two groups: (1) automatic bypasses, where the bypassing function is accomplished responsive to insertion or removal of the meter, and (2) manual bypasses, which require certain manipulation of lines or other equipment prior to removal of the meter. Many of the bypasses presently in use, both manual and automatic, must be built into the meter socket at the time of manufacture, because of the special nature of the equipment and relationship of parts. Efforts have been made to provide adapters for conventional sockets which include the bypass facilities, but such of these as I am aware of require additional jaw terminals and special parts which serve not only to increase the bulk of the installation, but also involve considerable time and effort in bringing about conversion of the socket to one equipped with bypass facilities.

One of the objects of the present invention is to provide a simple and economical bypass structure which is capable of being incorporated in a conventional meter socket and which permits continued use of the jaw terminals of the meter for reception of the meter blades. It is a feature of the invention that my bypass structure does not require the use of supplemental jaw terminals for receiving the blades of the meter, and does not interfere in any way with the normal relationship between the meter and the socket.

Another object of the invention is to provide bypass facilities of the character described which can be added to meter sockets already in use, and which do not increase in any way the depth of the socket casing or require that the meter project any further outward from the socket than it does in the absence of such facilities.

Still another object of the invention is to provide a manually operable bypass of the character described which can be readily attached and detached from the meter socket.

A further object of the invention is to provide a detachable ring type cover for conventional meter sockets, the cover being equipped with bypass facilities which are operable from outside the cover while it is in position on the socket casing and which are operatively coupled with the jaw terminals of the socket as the cover is closed.

Yet another object of the invention is to provide novel means for electrically connecting a conductor with a jaw terminal of a meter socket while still permitting normal recepion of a meter blade in the jaw terminal.

A still further object of the invention is to provide a manually operable bypass mechanism for ring-type meter sockets which is so constructed as to prevent operation of the bypass so long as the meter remains sealed to the socket. A further feature of my invention in this respect resides in the provision of means whereby the meter cannot be sealed to the socket except when the bypass is in non-shorting condition.

Another object of the invention is to provide bypass facilities of the character described which are compactly constructed and which can be fitted inside the socket housing without interfering with the effectiveness of the socket for its normal purposes.

Other and further objects of the invention, together with the features of novelty appurtenant thereto, will appear in the course of the following description.

In the accompanying drawings which form a part of the instant specification and are to be read in conjunction therewith, and in which like reference numerals indicate like parts in the various views:

FIG. 1 is a front elevational view of a meter socket equipped with bypass facilities according to the invention, parts of the cover being broken away for purposes of illustration;

FIG. 2 is a sectional view taken along the line 2—2 of FIG. 1 in the direction of the arrows;

FIG. 3 is a fragmentary front elevational view similar to FIG. 1 and on an enlarged scale showing the bypass mechanism in the non-shorting or non-bypass condition;

Figure 4:
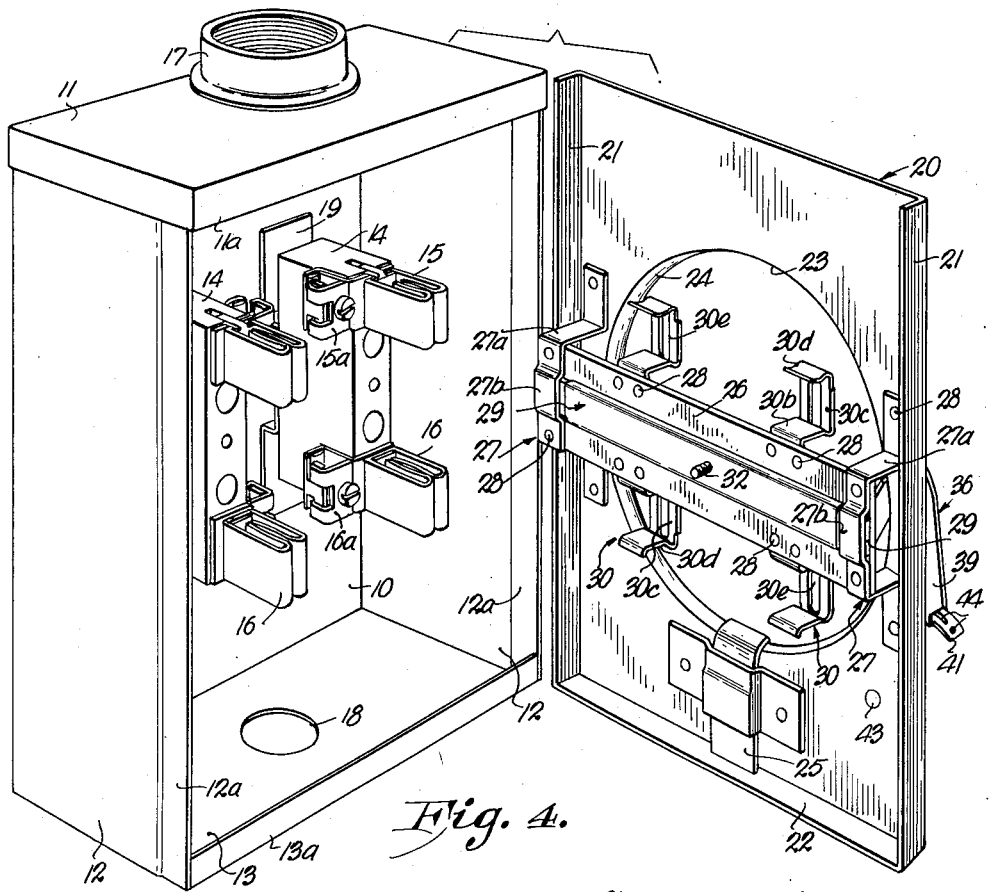
FIG. 4 is a front perspective view of the socket with the cover removed, the rear side of the cover being shown.

Referring to the drawing, reference numeral 10 indicates generally the back wall of a conventional meter socket casing having top wall 11, opposed side walls 12 and the bottom wall 13. As best seen in FIG. 3, the casing is of the open front type. The forward edges of the sides 12 are inset slightly, as at 12a. The forward edge of the top wall 11 has a depending flange, 11a, spaced slightly ahead of the edges of the side wall, and there is an upright flange 13a at the forward edge of the bottom wall.

Inside the casing, there are provided two vertically oriented insulation blocks 14, each of which carries a pair of spaced jaw terminals 15 and 16 of usual design. The upper two jaw terminals 15 can be connected to the power lines (not shown) by means of line terminals 15a integral therewith, while the lower two terminals 16 will be connected in like fashion by load terminals 16a to the load lines (not shown). The supply lines normally enter the casing through the conduit nipple 17 connected with and positioned in a suitable aperture in the top wall 11 of the casing. The load lines can be run out of the casing through a bottom opening, such as at 18, with which casings of this type are usually provided.

The insulation blocks 14 are firmly secured inside the casing, being in this instance supported from the back wall by bridge member 19, the ends of which are welded or otherwise secured to the back wall. The block is secured to its bridge by screws 20, which are threaded into the block through suitable apertures in the bridge.

A cover is ordinarily provided for casings of the type here shown, the cover having a central opening through which the meter blades can be inserted into the casing and connected with the jaw terminals. A conventional cover of this type is shown in my prior Patent 2,819,358, issued January 7, 1958. It will be understood, of course, that the four jaws 15 and 16 are so spaced as to correspond with the location of the four blades on the back of a conventional electric meter (not shown), and that the meter can be connected with the terminals by merely inserting or plugging the blades into the jaws. The insertion of the meter blades establishes a circuit from line to load through the meter. However, unless some means of shorting the upper jaw terminal 15 to the respective lower jaw terminals 16 should be provided, the circuit to the load terminals would be broken upon withdrawal of the meter.

My invention has for one of its broad purposes the provision of means for converting the standard socket as described thus far into one equipped with structure by which the line jaw terminals 15 can be shorted to the load jaw terminals 16 while the meter is still in connected position in the socket and to make such means a part of the cover so that existing meter sockets now in use can be equipped with bypass facilities simply by substituting a new cover employing my invention for the one presently on the socket.

The general shape and arrangement of the cover in my present invention is basically the same as that now in use and as disclosed in my aforesaid Patent 2,819,358. It comprises a flat cover panel 20 having inturned side flanges 21 and an inturned bottom flange 22. Centrally of the cover there is provided the usual circular opening 23, circumscribed by an outwardly rolled ring 24 against which the base of the meter seats when assembled with the socket. FIGS. 1, 2, and 3 show the cover in closed position on the casing. It will be noted that the upper edge of the cover fits up under flange 11a and that the inturned side flanges 21 overlap the inset portions of the side walls 12 of the casing. The bottom flange 22 underlies the casing bottom and the cover is secured in place by the sliding latch bolt 25 which engages behind the upturned flange 13a on the bottom wall of the casing.

The bypass structure includes a central insulation member 26 which spans the cover and is supported therefrom by generally U-shaped brackets 27 having parallel legs 27a. The member 26 may be composed of any good quality non-conductive material, such as fiberboard or the like. It is spaced away from the back of the cover and may be secured to the brackets 27 in any suitable fashion, as by rivets 28. A metallic reinforcing bar 29 runs the length of the member 26 and is of considerably less width than the insulation member. It is held to the insulation member at each end by the overlapping raised section 27b, of bracket 27, and is covered or coated with an electrical insulating medium such as rubber.

The width of the insulation member 26 is such that it will fit freely between the upper and lower pairs of jaw terminals 15 and 16 when the cover is moved into the closed position. It carries thereon four electrically conductive connector members 30, the construction of which can perhaps best be appreciated by referring initially to FIGS. 1 and 4.

Each connector member has a flat portion 30a riveted or otherwise secured to the front surface of the insulation member 26 and a U-shaped portion consisting of an inside leg 30b, outside leg 30d, and intervening bight portion 30c. The flat portion 30a of each connector member forms a support for the U-shaped portion, securing it to the insulation member in laterally extending relationship therewith. The connector members are so located and dimensioned that when the cover is moved into closed position, each will slip over a jaw terminal of the socket with the legs 30b and 30d on opposite sides of the jaws, and the bight portion 30c overlying and in contact with the end of the jaws. The spacing of the legs 30b and 30d is slightly less than the thickness of the jaws and they may be slightly inwardly convex whereby to insure of a gripping action on the jaw terminals by the legs as the connectors are engaged therewith.

Each connector 30 is provided in the bight portion 30c thereof with an elongate slot or opening 30e having its long axis aligned with the jaw opening. The slot 30e is provided with a width and length such that the meter blade will pass freely therethrough to be received between the jaws of the jaw terminals.

Positioned on the front side of insulation member 26 and aligned generally therewith is an elongate pivotal carrier element 31 which is pivoted centrally of the insulation member 26 by means of a screw 32. The carrier member is likewise formed of a stiff, non-conductive material such as fiberboard. The carrier element is fitted on opposite sides of its pivot axis with conductors 33, each of which may be in the form of a channel-like member having a base portion disposed between the carrier and the insulation member, and outturned legs which are received in a press fit in recesses 31a formed in the respective edges of the carrier. The carrier member is spring biased toward the insulation member by means of an arched leaf spring 34, which is sleeved in a protective and non-conductive envelope 34a, for example rubber or plastic. The spring is maintained in aligned condition with the carrier by the projecting legs of the conductors 33 (see FIG. 5).

It will be noted that screw 32 does not make threaded connection with the carrier, but instead extends therethrough in a bushing 35 and through a suitable aperture in the insulation member to threadedly connect with a tapped aperture in the metallic reinforcing bar 29. The bushing 35 is of slightly greater length than the thickness of the carrier whereby to space the carrier slightly away from the adjacent surface of the insulation member.

The conductor members 33 are each of a width such that when the carrier is in the horizontal position of FIG. 1, the opposite margins of the base portion of the conductor members engage and make electrical contact with the spaced but confronting ends of the flat portions 30a of opposed connectors 30. To assist in establishing a firm electrical contact, the confronting ends of the flat portions are provided with raised ribs 30f.

FIG. 1 illustrates the bypass condition for the meter socket. Through the medium of the connectors 30 and conductors 33, the upper line jaw terminals 15 are shorted directly to the lower line jaw terminals 16. Withdrawal of a meter installed in the socket thus would not result in interruption of current flow to the consumer. The spring 34, having its end portions engaging the insulation member near the conductors, assists in pressing the conductors into firm engagement with the contacting surface of the connectors and assures of good electrical contact.

The non-shorting or non-bypass condition for the carrier element 31 is illustrated in FIG. 3. This condition is obtained by rotating the carrier about its pivot screw counter-clockwise so as to shift the conductors 33 and disengage each from one of its two associated connectors 30. The disengagement of each conductor 33 from one of the associated connectors breaks the direct circuit from line to load and thus insures that all current will flow through the meter when it is in connected position in the socket. The position of the carrier illustrated in FIG. 3 is the normal operating position for the carrier when the meter is in service.

Shifting of the carrier element between the normal and bypass positions is accomplished by means of an arm or handle generally indicated at 36. The handle includes a loop portion 37 which loosely surrounds the carrier near one end (the left-hand end as viewed in FIGS. 1 and 2). The fit between the loop portion 37 and carrier should be such that the loop can slide lengthwise of the carrier. Extending outwardly from the loop 37 is an extension 38, which is reversely bent over the ring 24 and terminates in a downward extension 39 which is parallel with and closely adjacent to the front of the cover. The front surface of socket ring 24 is inset or depressed as at 40 (FIG. 2) so that that portion of the handle which overlies the socket ring has its outer surface substantially in the plane of the seating surface of the ring. The length of the depression 40 is such as to accommodate the displacement of the handle required in the shifting of the carrier between the normal and bypass positions.

An outwardly projecting tab 41 is formed on the lower end of handle extension 39 and provides a gripping surface by which the handle can be manipulated. This tab also provides means whereby the handle may be locked in the normal non-bypass position illustrated in FIG. 3. The lock is completed by a swinging latch member 42, which is pivoted to the cover as by rivet 43. The latch member has an outwardly extending flange 42a adapted to be swung in behind and to overlap tab 41 when the handle is in the downward or non-bypass position. Both the tab and flange are provided with corresponding apertures of the type shown at 44 in FIG. 5 through which a sealing wire (not shown) can be threaded to tie the two together and prevent any movement of the handle until the seal is broken and latch 42 disengaged from the tab on the handle.

In order that the handle structure will not interfere with normal closing and connecting of the usual sealing ring R (shown in broken lines in FIGS. 1, 2 and 3) about the seating ring 24 of the cover when the handle is in the non-bypass condition, the edge of the cover ring is cut out as at 45. The reversely bent position of the handle can be moved laterally into this recess due to the sliding fit of the loop 37 with the carrier element.

The cut-out 45 is provided with a bevelled or inclined edge as at 46 which causes the handle to be displaced outwardly or to one side of the ring as it is pushed up to the FIG. 1 or bypass position. The sliding connection of the handle with the carrier 26 afforded by the loop 37 again permits the necessary displacement of the handle lengthwise of the carrier. The sideways displacement of the handle insures that when the carrier is in the bypass condition, the sealing ring R cannot be closed because of the interference between the sealing ring and handle prevents bringing of the ends R' and R" of the sealing ring close enough together to connect them, as shown in FIG. 1.

It will be evident that the sealing ring R assists in preventing movement of the handle 36 to the upper or bypass position while it still remains in its closed or sealing condition. Unless the ends of the sealing ring are disconnected to permit expansion of the ring, the handle will strike against the inside edge of the ring and will be prevented from riding out of the recess or cutout 45.

Figures 5, 6:
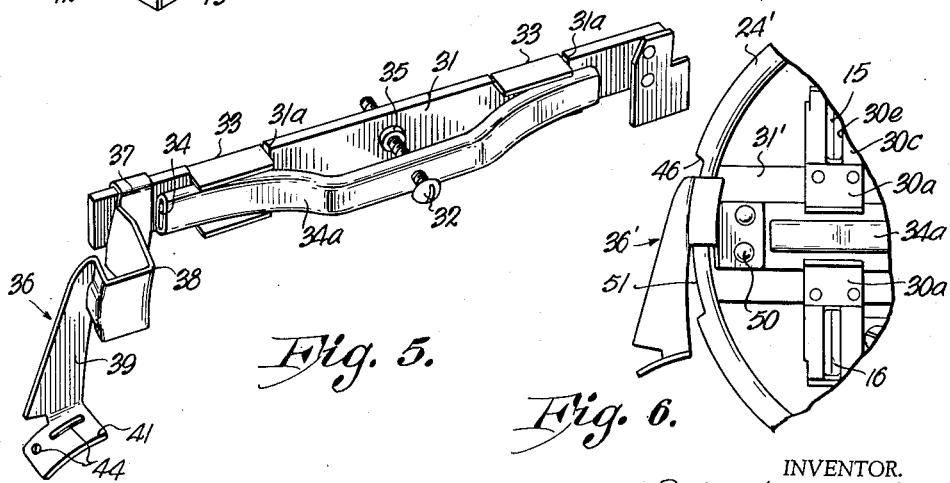
FIG. 5 is an enlarged perspective view of the pivotal carrier member and spring, the carrier member being shown disassociated from the rest of the mechanism.
FIG. 6 is a fragmentary front elevational view of a portion of a modified structure in accordance with the invention.

In situations where it is not felt necessary to include means for preventing closing of the sealing ring about the meter when the handle is in the bypass condition, the arrangement shown in FIG. 6 may be employed. Here the handle 36' is riveted directly to the carrier 31' by means of rivets 50. In this case, a longer portion of the cover ring 23' is cut away as at 51.

From the foregoing it will be seen that this invention is one well adapted to attain all of the ends and object hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. A detachable ring type cover for a meter socket of the type having an open front casing in which are positioned line connected and load connected jaw terminals for receiving the blades of a plug in blade type meter, said cover including an opening therethrough for the blades of the meter circumscribed by a projecting ring adapted to engage the base of the meter when the meter blades are inserted in the jaw terminals, an insulation member connected with and supported by the cover and spaced inwardly of the cover in position between the line connected jaw terminals and load connected jaw terminals, a plurality of electrically conductive connector members, one for each jaw terminal, mounted to and extending laterally from said insulation member, said connector members constructed and arranged to engage and make electrical contact with the respective jaw terminals as the cover is closed on the casing while leaving the meter ends of the jaw terminals free to receive therein the blades of the meter, a carrier member supported on said insulation member for movement relative thereto between first and second positions, and conductors on said carriers and so positioned as to short the connector members on the line jaw terminals to the connector members on the load jaw terminals when the carrier member is in one of said positions and while the cover and meter are in the normal operating positions.

2. A detachable ring type cover for a meter socket of the type having an open front casing in which are positioned line connected and load connected jaw terminals for receiving the blades of a blade type plug in meter, said cover including an opening therethrough proportioned to receive the blades of the meter and circumscribed by an outwardly projecting ring forming a seat for the meter when the meter blades are inserted in the jaw terminals, an insulation member connected with and supported by said cover, said insulation member spaced inwardly of the cover and oriented to lie between the load and line terminals, a plurality of U-shaped inwardly open electrically conductive connector members, one for each jaw terminal, secured to and extending from said insulation member and fitting over said jaw terminals with the legs of each connector member on opposite sides of a jaw terminal and the bight over the outer end of the jaw, each said bight provided with an opening therethrough permitting insertion of the meter blade into the jaw terminal, a carrier member supported on said insulation member for movement relative thereto between first and second positions, and conductors on said carrier member and so positioned as to short the connector members on the line jaw terminals to the connector members on the load jaw terminals when the carrier member is in one of said positions and while the cover and meter are in the normal operating position.

3. A detachable ring type cover for a meter socket of the type for mounting a blade type plug in meter and in which are provided upper and lower pairs of jaw terminals insulated from one another and connected with the line and load, said cover including an opening therethrough proportioned to receive the blades of the meter and circumscribed by an outwardly projecting flange forming a seat for the meter, an insulation member spaced inwardly from the cover and supported therefrom, said insulation member sized to fit between the upper and lower pairs of jaw terminals inside the socket when the cover is positioned thereon, two pairs of electrically conductive connector members secured to said insulation member and positioned to make contact with the respective pairs of jaw terminals while leaving the ends of the jaw terminals open for reception of the meter blades, a carrier member, means pivotally connecting said carrier member to said insulation member, said carrier member shiftable between a first position and a second position relative to said insulation member, a pair of conductor members mounted on said carrier at locations spaced from the pivot axis thereof, said conductor members arranged to connect electrically the pairs of connectors when the carrier is in first position and to disconnect them when the carrier is in second position, and an extension on said carrier member passing through the opening in the cover and across said seat whereby to provide for shifting said carrier from externally of the cover.

4. A cover as set forth in claim 3 including disengageable latching means connected with the cover and operable to engage and hold said extension in the second position.

5. A cover as set forth in claim 3 wherein said extension is connected with the carrier for providing movement thereon and wherein said ring is provided with a cutout in one edge in which a portion of said extension is received when the carrier is in said second position.

6. A detachable ring-type cover for a meter socket of the type for mounting a blade-type plug in meter in which are provided upper and lower pairs of jaw terminals insulated from one another and connected with the line and load, said cover including an opening therethrough proportioned to receive the blades of the meter and circumscribed by an outwardly projecting flange forming a seat for the meter, an insulation member spaced inwardly from the cover and supported therefrom, said insulation member so located and sized as to fit between the upper and lower pairs of jaw terminals inside the socket when the cover is positioned thereon, a plurality of U-shaped inwardly open electrically conductive connector members, one for each jaw terminal, secured to and extending from said insulation member and fitting over said jaw terminals with the legs of each connector member on opposite sides of a jaw terminal and the bight over the outer end of the jaw, each said bight provided with an opening therethrough permitting insertion of the meter blade into the jaw terminal, a carrier member, means pivotally connecting said carrier member to said insulation member, said carrier member shiftable between a first position and a second position relative to said insulation member, a pair of conductor members mounted on said carrier at locations spaced from the pivot axis thereof, said conductor members arranged to connect electrically the pairs of connectors when the carrier is in first position and to disconnect them when the carrier is in second position, and operating means connected with said carrier, said means including an operating member located externally of said cover and operable to shift said carrier between said positions.

References Cited in the file of this patent

UNITED STATES PATENTS

| | | |
|---|---|---|
| 2,126,602 | Bakke | Aug. 9, 1938 |
| 2,184,840 | Johansson et al. | Dec. 26, 1939 |
| 2,606,232 | St. John | Aug. 5, 1952 |
| 2,838,626 | Kuhn | June 10, 1958 |